| United States Patent [19] | [11] | 3,998,302 |
|---|---|---|
| Schupner | [45] | Dec. 21, 1976 |

[54] ADJUSTABLE SHOCK ABSORBER UNIT
[75] Inventor: Willard J. Schupner, Palatine, Ill.
[73] Assignee: Efdyn Corporation, Chicago, Ill.
[22] Filed: Aug. 6, 1975
[21] Appl. No.: 602,474
[52] U.S. Cl. .................................. 188/285; 74/57; 188/287;318
[51] Int. Cl.² ........................ F16F 9/44; F16F 9/48
[58] Field of Search .......... 188/285, 287, 313, 318; 74/57

[56] References Cited

UNITED STATES PATENTS

| 2,628,692 | 2/1953 | Hufferd | 188/285 |
| 2,673,964 | 3/1954 | Morton et al. | 74/57 X |
| 3,168,168 | 2/1965 | Chorkey | 188/287 |
| 3,344,894 | 10/1967 | Kenworthy | 188/287 |
| 3,510,117 | 5/1970 | Scholin et al. | 188/287 X |
| 3,645,365 | 2/1972 | Domek | 188/287 X |
| 3,693,767 | 9/1972 | Johnson | 188/287 X |
| 3,840,097 | 10/1974 | Holley | 188/287 |

Primary Examiner—George E. A. Halvosa
Attorney, Agent, or Firm—Darbo, Robertson & Vandenburgh

[57] ABSTRACT

A shock absorber having a pressure tube with metering bores defining metering orifices through which fluid is metered upon application of impact forces to a piston assembly slidable in the pressure tube, and an adjustable metering sleeve with ports adjacent the metering orifices for regulating the flow of fluid through the orifices.

2 Claims, 7 Drawing Figures

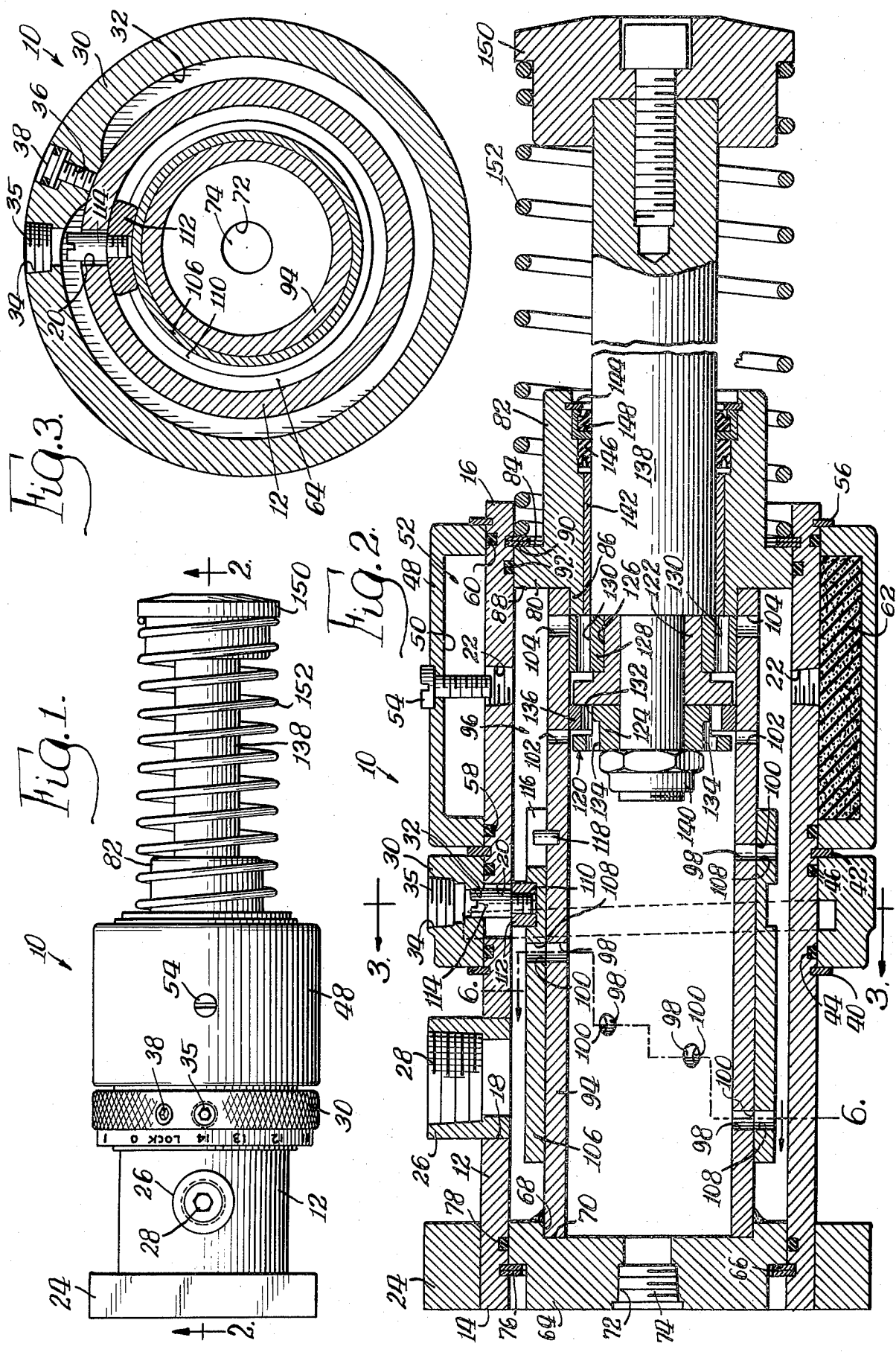

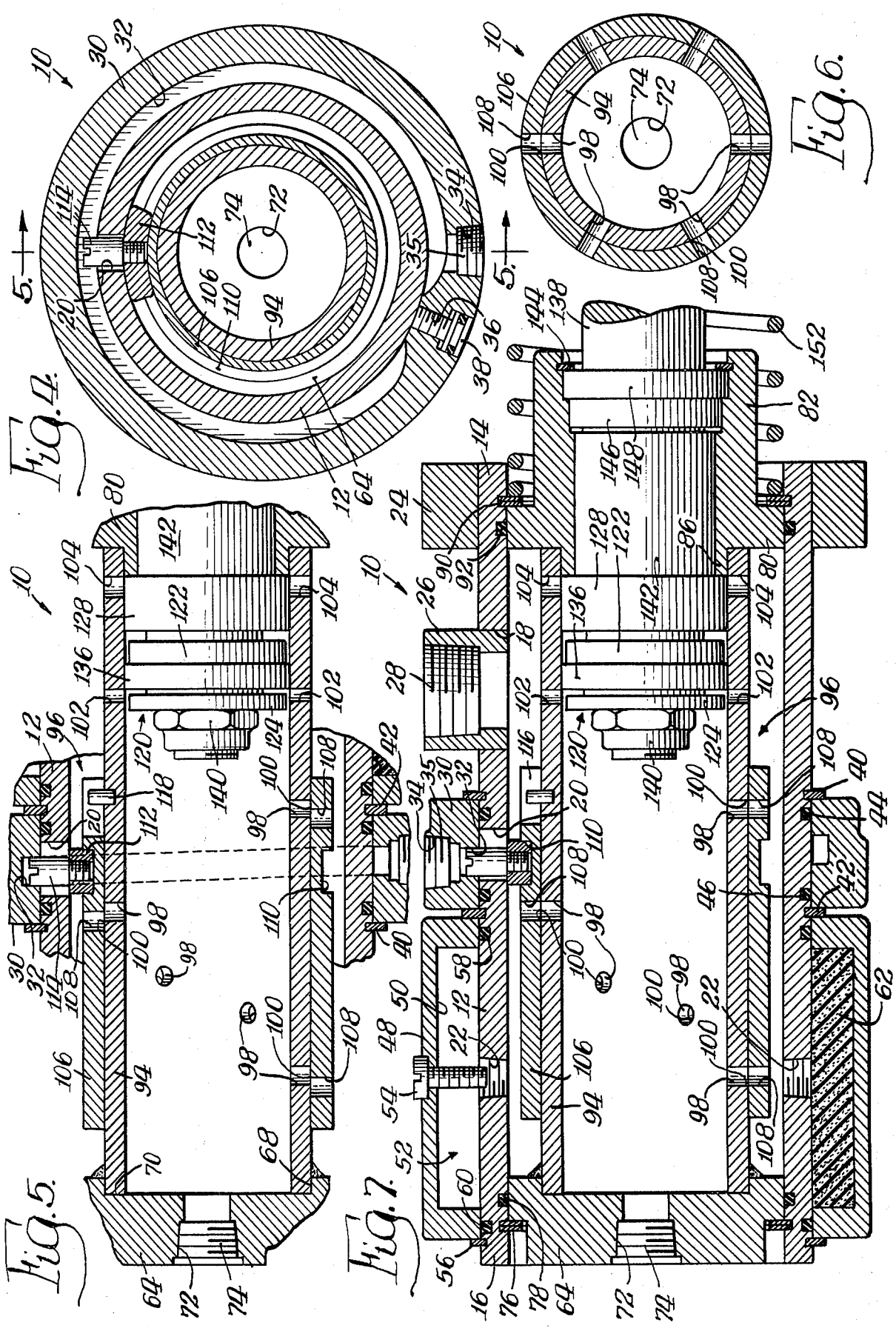

ADJUSTABLE SHOCK ABSORBER UNIT

BACKGROUND OF THE INVENTION

1. Field of the Invention

The present invention relates generally to a hydraulic shock absorber, which is adapted for use, for example, in aircraft, automotive, machine and railroad applications, and which is capable of being adjusted to decelerate loads at different rates.

2. Description of the Prior Art

Hydraulic shock absorbers basically comprise a pressure tube or chamber filled with fluid and having slidably mounted therein a piston which is connected to a piston rod adapted to receive impact forces. Heretofore, certain shock absorbers have been provided with metering orifices for the pressure tube through which fluid is forced when the shock absorber is under load, and means for regulating the metering orifices. However, such prior constructions have not been as efficient in operation, as durable in service, as compact in construction, as economical to manufacture, and as readily adjustable, as might be desired.

SUMMARY OF THE INVENTION

The shock absorber of the present invention comprises an elongated casing having a forward end and a rearward end. A pressure tube extends lengthwise within the casing and defines a chamber therebetween. A piston assembly is axially movable in the pressure tube, and a piston rod connected to the piston assembly extends outwardly of the forward end of the casing for receiving impact forces. Formed in the wall of the pressure tube is at least one radial metering bore which defines an orifice open at the outer surface of the pressure tube.

Surrounding the pressure tube within the casing is a metering sleeve having a radial port adjacent the orifice for establishing the effective area thereof. Movement of the metering sleeve relative to the pressure tube serves to adjust the position of the port relative to the bore to vary the effective area of the orifice whereby to regulate the flow of fluid outwardly of the pressure tube through the bore and the port to the chamber as the piston assembly moves rearwardly in the pressure tube.

The arrangement of the elements of the shock absorber of the present invention, as described generally above and as will be described in greater detail hereinafter, overcomes the disadvantages of prior constructions noted above.

BRIEF DESCRIPTION OF THE DRAWINGS

FIG. 1 is a side elevational view of the shock absorber of the present invention;

FIG. 2 is a longitudinal sectional view, on an enlarged scale, taken substantially along the line 2—2 in FIG. 1 looking in the direction indicated by the arrows;

FIG. 3 is a transverse sectional view taken substantially along the line 3—3 in FIG. 2 looking in the direction indicated by the arrows;

FIG. 4 is a transverse sectional view corresponding generally to FIG. 3, but shows the elements of the shock absorber in a changed position;

FIG. 5 is a partial longitudinal sectional view taken substantially along the line 5—5 in FIG. 4 looking in the direction indicated by the arrows;

FIG. 6 is a generally transverse sectional view taken substantially along the line 6—6 in FIG. 2 looking in the direction indicated by the arrows; and FIG. 7 is a longitudinal sectional view corresponding generally to FIG. 2, but shows certain of the elements of the shock absorber mounted in reverse position.

DESCRIPTION OF THE PREFERRED EMBODIMENT

Referring now to the drawings and particularly FIG. 2, the shock absorber 10 of the present invention comprises an elongated outer tubular casing 12 presenting one end 14 and a second end 16. The casing 12 is formed with a radial opening 18, a radial slot 20 elongated in the lengthwise or axial direction, and a pair of radial opposed ports 22. A mounting flange 24 is secured to the casing end 14, a pipe coupling 26 is secured in the casing opening 18, and a plug screw 28 is threaded in the pipe coupling 26.

Rotatably mounted on the casing 12, intermediate of the ends thereof, is a metering adjustment ring 30 formed with an internal generally annular rectangular (in cross section) spiral groove 32 of about 360° extent, a partially threaded radial access opening 34 in which is threaded a plug screw 35, and a partially threaded radial aperture 36 (FIG. 3) in which is threaded a lock screw 38. Snap rings 40 and 42 retain the metering adjustment ring 30 against axial movement, and seal rings 44 and 46 are interposed between the ring 30 and the casing 12.

Also mounted on the casing 12 surrounding the casing ports 22 is an annular accumulator housing 48 formed with an interior annular recess 50 which defines with the casing 12 an accumulator chamber 52. The housing 48 is provided with a seal screw 54, and is held axially in place between the snap ring 42 and a snap ring 56. Seal rings 58 and 60 are interposed between the housing 48 and the casing 12. When desired, the accumulator chamber 52 may be partially or completely filled with a cellular maaterial 62, such as rubber, which serves as a fluid accumulator.

Mounted in the rearward end of the casing 12 is a back head member 64 formed with a rearwardly facing annular shoulder 66, with a bore 68 defining a forwardly facing annular shoulder 70, and with a partially threaded center axial opening 72 in which is threaded a plug screw 74. A snap ring 76, bearing against the shoulder 66, retains the head member 64 against axial movement outwardly of the casing 12; and a seal ring 78 is interposed between the head member 64 and the casing 12.

Mounted in the forward end of the casing 12 is a front head or gland member 80. The outer end portion 82 of the gland member 80 is of reduced diameter and presents a forwardly facing annular shoulder 84, while the inner end portion 86 of the gland member 80 is of still further reduced diameter and presents a rearwardly facing annular shoulder 88. A snap ring 90, bearing against the shoulder 84, retains the gland member 80 against axial movement outwardly of the casing 12; and a seal ring 92 is interposed between the gland member 80 and the casing 12.

Extending lengthwise, i.e., axially, within the casing 12 is a pressure tube 94 which at its rearward end is secured in the bore 68 of the back head member 64 and at its forward end is received on the inner end portion 86 of the gland member 80. The pressure tube 94 is axially located between the shoulders 70 and 88 of the back and front head members 64 and 80 respectively, and is disposed coaxially of the casing 12 to define a generally annular fluid chamber 96 therebetween.

Formed in the wall of the rear section of the pressure tube 94 are a plurality of radial metering bores 98 of uniform diameter which define metering orifices 100 open at the outer surface of the pressure tube 94. The bores 98 are radially dispersed and are exponentially spaced apart axially in a rearward direction. Formed in the wall of the front section of the pressure tube 94 are first and second sets of opposed radial passageways 102 and 104 open to the chamber 96.

Slidably mounted on the pressure tube 94 is a metering sleeve 106 provided with a plurality of ports 108, which correspond in number, size and relative location to the metering bores 98, and which are arranged adjacent the metering orifices 100 for establishing the effective area thereof. The metering sleeve 106 is provided with an annular groove 110 in which is seated an arcuate segment shoe 112. Secured in the shoe 112 is a follower screw 114 that extends through the casing slot 20 into engagement with the spiral groove 32 of the metering adjustment ring 30. The metering sleeve 106 is also formed with a front axial slot 116. A pin member 118, which is secured in the pressure tube 94, projects into the slot 116 for preventing rotational movement of the metering sleeve 106 while accommodating axial movement of the latter. Rotation of the metering ring 30 serves to effect axial movement of the metering sleeve 106, and hence uniform axial movement of the ports 108 relative to the bores 98, through the cooperating spiral groove 32, and the pin means comprising follower screw 114 and shoe 112.

Mounted for axial movement within the pressure tube 94 is a piston assembly 120 which includes a forward piston section 122 and a rearward piston section 124. The major outer diameters of the piston sections 122 and 124 are slightly less than the inner diameter of the pressure tube 94 to provide annular clearance therebetween. The forward piston section 122 is formed with an annular recess 126 in which is seated a collar member 128 having a plurality of circumferentially spaced apart axial ports 130. The rearward piston section 124 is formed with an annular groove 132 which communicates with axial ports 134 opening at the rearward side of the piston section 124. Arranged within the groove 132 is a floating piston ring 136 which is narrower than the width of the groove 132.

The piston sections 122 and 124 are secured on the inner end of a piston rod 138 by means of a nut 140, and the piston rod 138 extends from the forward side of the piston assembly 120 outwardly of the forward end of the casing 12 for receiving impact forces. The piston rod 138 is slidably supported in a bearing sleeve 142 secured in the gland member 80. Also secured in the outer end portion 82 of the gland member 80, by a snap ring 144, are a seal ring 146 and a wiper ring 148. The outer end of the piston rod 138 has secured thereon a bumper cap 150. Interposed between the snap ring 90 and the bumper cap 150 is a coil spring 152 which biases the piston rod 138 forwardly to dispose the piston assembly 120 in a normal rest position with the collar member 128 engaged against the inner end portion 86 of the gland member 80.

The metering bores 98 open to the pressure tube 94 on the rearward side of the piston assembly 120 when the latter is in its normal rest position, and the rearwardmost bore 98 is so arranged that it is closed to the pressure side of the pressure tube 94 at the end of the stroke of the piston rod 138. To make the shock absorber 10 operational, it is filled to the desired level with suitable hydraulic fluid. The plug and seal screws 28 and 54 are removable to permit either the addition of fluid to the shock absorber or the bleeding of air therefrom. When the shock absorber 10 is to be used, the metering sleeve 106 (by rotation of the metering ring 30) is axially adjusted, for example from the position shown in FIG. 2 to the position shown in FIG. 5, to offset the ports 108 relative to the bores 98 to a position corresponding to the desired effective area of the orifices 100.

In the operation of the shock absorber 10, impact forces received by the bumper cap 150 cause the piston rod 138 and piston assembly 120 to move rearwardly within the pressure tube 94. As rearward movement of the piston assembly 120 commences, pressure initially built up in the hydraulic fluid within the pressure tube 94 rearwardly of the piston assembly 120 causes the floating piston ring 136 to be forced into abutment with the forward piston section 122 thereby preventing hydraulic fluid from flowing therepast. During rearward movement of the piston assembly 120, the hydraulic fluid is forced outwardly of the pressure tube 94, through the bores 98, orifices 100 and ports 108, to the chamber 96. At the same time, the chamber 96 communicates through the pressure tube passageways 102 and 104 with the interior of the pressure tube 94 permitting some hydraulic fluid to flow to the forward side of the piston assembly 120 as the latter moves rearwardly of the passageways 102 and 104. Also, the chamber 96 communicates through the casing ports 22 with the accumulator chamber 52 wherein the cellular material 62 compresses to compensate for the fluid displaced by the piston rod 138 during its inward stroke.

As the piston assembly 120 moves past and closes off successive metering bores 98, there is a reduction in the number of bores and the associated orifices 100, and hence in the total effective area of the orifices, through which fluid can be displaced from the pressure tube 94. At the beginning of the stroke of the piston rod 138, the total effective area of the orifices available for fluid displacement is at a maximum, while at the end of the stroke, when the piston assembly 120 has moved past all of the bores 98, the total effective area of the orifices available for fluid displacement is zero. Because the bores 98 are of uniform diameter and are axially spaced apart exponentially, and because the individual effective areas of the orifices 100 are uniform, the total effective orifice area available for fluid displacement decreases exponentially with the stroke of the piston assembly.

When the impact force is removed from the bumper cap 150, the spring 152 serves to return the piston rod 138 and piston assembly 120 to the normal rest position shown in FIG. 2. During such forward return motion of the piston assembly 120, the floating piston ring 136 abuts the rearward piston section 124 thereby permitting the free flow of hydraulic fluid past the piston assembly from the forward to the rearward side thereof through the ports 130, the clearance at the periphery of the forward piston section 122, the groove 132, and the ports 134.

The rate at which loads are decelerated by the shock absorber 10 is a function of the rate at which fluid is displaced through the metering orifices 100 which in turn is a function of the effective or exposed area of the orifices 100. The effective area of each orifice 100 may be varied infinitely (within the range of the device) and uniformly by axially adjusting the position of the metering sleeve 106, and the position or offset of the ports 108 relatvie to the bores 98, through rotatable adjustment of the metering ring 30. The degree or extent of adjustment of the metering sleeve 106 per fraction of revolution of the metering ring 30 depends upon the pitch of the spiral groove 32 and the diameter of the bores 98. As the ring 30 is rotated about the axis, follower screw 114, which is prevented from so rotating by the sides of axial slot 20, is urged axially by the sides of spiral groove 32. The follower screw imparts a corresponding motion to metering sleeve 106. Since the spiral groove 32 is almost 360° in length it is possible for the ring 30 to be moved only a small fraction of 360° to thereby obtain a small increment of axial movement of sleeve 106, i.e., the shock absorber may be fine tuned. When the desired position is estalished lock screw 36 is tightened against casing 12 to hold ring 30 and thus follower screw 114 and sleeve 106 in place.

The shock absorber 10 shown in FIGS. 1–6 is assembled for rear flange mounting, with the mounting flange 24 disposed at the rearward end of the casing unit. Alternatively, the shock absorber 10 may be assembled for front flange mounting, with the mounting flange 24 disposed at the forward end of the casing unit, simply by reversing the casing 12 and its associated elements with respect to the pressure tube 94 and its associated elements as shown in FIG. 7. This alternative assembly functions in the same manner as described above in reference to the assembly of FIG. 2.

The shock absorber 10 offers the following advantages: the casing 12, pressure tube 94 and metering sleeve 106 are fabricated from drawn-over-mandrel steel tubing which minimizes finish machining; the piston rod 138 is of relatively large diameter; the various seal rings may be assembled with minimum or no damage thereto; the metering orifices 100 are radially dispersed and thus present less chance of fatigue crack propagation than orifices arranged axially in-line as in prior constructions; the provision of the metering bores 98 eliminates the use of metering slots and grooves at the surface of the pressure tube 94 which would tend to reduce the strength of the latter; the ratio of rotary adjustment travel of the metering ring 30 to axial adjustment travel of the metering sleeve 106 affords convenient orifice adjustment with high stability and low sensitivity; and the shock absorber may be conveniently assembled for either rear or front flange mounting. In sum, the shock absorber 10 is more efficient in operation, more durable in service, more compact in construction, more economical to manufacture, and more readily adjustable, than comparable shock absorbers of the prior art.

While there has been shown and described a preferred embodiment of the present invention, it will be understood by those skilled in the art that various rearrangements and modifications may be made therein without departing from the spirit and scope of the invention.

The invention claimed is:

1. In a shock absorber comprising an annular outer casing having a forward end and a rearward end, a pressure tube extending lengthwise within said casing and defining a chamber therebetween, a piston assembly axially movable along an axis within said pressure tube, a piston rod connected to said piston assembly and extending outwardly of said forward end of said casing for receiving impact forces, said pressure tube having at least one radial metering bore formed in the wall thereof which defines an orifice open at the outer surface of said pressure tube, and a metering sleeve surrounding said pressure tube within said casing and having a radial port adjacent said orifice for establishing the effective area thereof, said metering sleeve being axially movable relative to said pressure tube to adjust the position of said port relative to said bore to vary the effective area of said orifice to thereby regulate the flow of fluid outwardly of said pressure tube through said bore and said port to said chamber as said piston assembly moves rearwardly in said pressure tube, the improvement comprising:

said outer casing having a slot therein which slot is elongated in an axial direction, pin means extending through said slot and engaging said metering sleeve, said pin means being movable in the axial direction in said slot and by said engagement with said metering sleeve imparting a corresponding movement to said sleeve, operating means externally of said casing engaging said pin means for moving said pin means axially in said slot and for locking the pin means against unintentional axial movement in said slot, and seal means for preventing fluid loss through that part of the slot not occupied by said pin, said means externally of said casing comprising an adjustment ring mounted on said casing for rotation about said axis with respect to the casing, said ring having a spiral groove on the inside thereof extending only part way through the ring in a radial direction, said pin extending into said groove; said seal means being between said ring and said casing.

2. In a shock absorber as set forth in claim 1, wherein said groove is about 360° in length.

* * * * *